(12) United States Patent
Soler Balcells

(10) Patent No.: US 10,611,053 B2
(45) Date of Patent: Apr. 7, 2020

(54) REMOVABLE RULER FOR MANUAL CERAMIC CUTTERS

(71) Applicant: GERMANS BOADA, S.A., Rubi (Barcelona) (ES)

(72) Inventor: Jordi Soler Balcells, Rubi (ES)

(73) Assignee: GERMANS BOADA, S.A., Rubi (Barcelona) (ES)

( * ) Notice: Subject to any disclaimer, the term of this patent is extended or adjusted under 35 U.S.C. 154(b) by 203 days.

(21) Appl. No.: 15/559,727

(22) PCT Filed: Feb. 24, 2016

(86) PCT No.: PCT/ES2016/070119
§ 371 (c)(1),
(2) Date: Sep. 19, 2017

(87) PCT Pub. No.: WO2016/151165
PCT Pub. Date: Sep. 29, 2016

(65) Prior Publication Data
US 2018/0043574 A1 Feb. 15, 2018

(30) Foreign Application Priority Data

Mar. 20, 2015 (ES) .................................. 201500224

(51) Int. Cl.
*B28D 7/00* (2006.01)
*F16B 2/08* (2006.01)
*F16B 2/14* (2006.01)
*B28D 7/04* (2006.01)
(Continued)

(52) U.S. Cl.
CPC ................ *B28D 7/00* (2013.01); *A47B 27/00* (2013.01); *B28D 1/225* (2013.01); *B28D 7/043* (2013.01);
(Continued)

(58) Field of Classification Search
CPC ... B28D 7/00; A47B 27/00; B43L 5/00; B43L 13/02
(Continued)

(56) References Cited

U.S. PATENT DOCUMENTS

| 481,637 A | * | 8/1892 | Poole | ..................... G01B 3/566 33/478 |
| 846,248 A | * | 3/1907 | Schmalz | ................ G01B 3/566 33/478 |

(Continued)

FOREIGN PATENT DOCUMENTS

| CN | 202846721 U | 4/2013 |
| CN | 203945503 U | 11/2014 |

(Continued)

OTHER PUBLICATIONS

International Search Report dated Apr. 6, 2016 of corresponding International application No. PCT/ES2016/070119; 6 pgs.

*Primary Examiner* — Christopher W Fulton
(74) *Attorney, Agent, or Firm* — Maier & Maier, PLLC

(57) ABSTRACT

A removable ruler for manual ceramic cutters which can be rotatably mounted on the base of a manual ceramic cutter and which includes a rotary platform permanently secured to the base of the cutter by a rotary shaft; and two removable lateral extensions. The platform includes securing means for the rapid coupling and subsequent uncoupling of the lateral extensions.

1 Claim, 6 Drawing Sheets

(51) Int. Cl.
*B43L 5/00* (2006.01)
*B43L 13/02* (2006.01)
*A47B 27/00* (2006.01)
*B28D 1/22* (2006.01)
*G01B 3/04* (2006.01)
*F16B 21/12* (2006.01)

(52) U.S. Cl.
CPC .............. *B43L 5/00* (2013.01); *B43L 13/02* (2013.01); *F16B 2/08* (2013.01); *F16B 2/14* (2013.01); *G01B 3/04* (2013.01); *F16B 21/12* (2013.01)

(58) Field of Classification Search
USPC .................................................. 33/435, 478
See application file for complete search history.

(56) References Cited

U.S. PATENT DOCUMENTS

| | | | | |
|---|---|---|---|---|
| 855,916 | A * | 6/1907 | Werner | B43L 13/048 192/93 A |
| 909,023 | A * | 1/1909 | Ratner | A41H 3/002 33/11 |
| 3,104,477 | A * | 9/1963 | Edwill | G01C 9/28 33/374 |
| 3,261,099 | A * | 7/1966 | Blake | B43L 13/005 33/435 |
| 4,928,395 | A * | 5/1990 | Good | G01C 9/24 33/374 |
| 5,169,045 | A * | 12/1992 | Liu | B28D 1/225 125/23.02 |
| 5,388,338 | A * | 2/1995 | Majors | G01C 9/28 206/372 |
| 5,819,427 | A * | 10/1998 | Rohweder | G01B 5/245 33/478 |
| 6,237,237 | B1 * | 5/2001 | McKenna | G01C 9/28 33/374 |
| 7,805,850 | B1 * | 10/2010 | Cooper | G01B 5/245 33/374 |
| 2002/0121025 | A1 * | 9/2002 | Leite | G01C 9/28 33/374 |

FOREIGN PATENT DOCUMENTS

| | | |
|---|---|---|
| ES | 2064248 A2 | 1/1995 |
| ES | 1040704 U | 5/1999 |
| FR | 2756208 A1 | 5/1998 |

* cited by examiner

REMOVABLE RULER FOR MANUAL CERAMIC CUTTERS

OBJECT OF THE INVENTION

The object of the present invention is a removable ruler for manual ceramic cutters that have particular constructive characteristics intended to increase the reliability of use thereof and simplify the mounting and removing of the same in the cutter.

FIELD OF APPLICATION OF THE INVENTION

This invention is applicable to manual ceramic cutters.

STATE OF THE ART

Currently, manual ceramic cutters having a base with a support surface for the ceramic parts to be cut; the ends of said base being attached to supports of at least a longitudinal guide for the movement of a toolholder head provided with a handle and a cutting tool, and a tool for separating the ceramic parts previously scored with said cutting tool, are known.

It is also known that these manual ceramic cutters have a ruler on one of the ends of the base that comprises two segments or lateral extensions attached to a platform that is mounted on the base by means of a rotary shaft that is perpendicular to the shaft, aligned with the longitudinal mid-plane of the base and subsequently with the scoring line of the ceramic parts by the cutting tool.

A cutter with a rotary ruler of this type is described in the utility model ES 1040704 U, of the same applicant of the present invention, which further comprises a securing element of the platform, and therefore of the ruler, with respect to the base; the ruler forming a variable angle with the longitudinal mid-plane of the base.

In this type of cutter, the segments or lateral extensions are attached and secured to the rotary platform, it being necessary to remove the entire ruler, in other words, the platform along with the lateral extensions of the base of the cutter, in order to make the collection and transport thereof easier.

The need to remove the entire ruler from the base of the cutter is a hassle for the operator and involves a risk of deterioration of the rotary shaft of the platform, generally formed by a screw, due to the frequent mounting and removal of the same.

The applicant of the present invention is not aware of the existence of prior art satisfactorily solves the problem set forth previously.

DESCRIPTION OF THE INVENTION

The removable ruler for manual ceramic cutters object of this invention have particular constructive characteristics intended to facilitate the partial handling and removal thereof by the user.

To do so, and according to the invention, the ruler is made up of three independent parts, specifically a rotary platform provided with a rotary shaft for the permanent securing thereof to the base of the cutter, and two removable lateral extensions, the platform comprising securing means for the rapid coupling and uncoupling of the lateral extensions.

With the aforementioned characteristics, the rotary platform of the ruler remains secured to the base, one only needing to release the securing means for coupling the lateral extensions so that they are uncoupled from the platform.

It is provided that the cutter has a securing element for the platform in the chosen rotary position, such that the extensions form a suitable angle with the longitudinal mid-plane of the base in each case for cutting the ceramic part.

DESCRIPTION OF THE FIGURES

As a complement to the description provided herein, and for the purpose of helping to make the characteristics of the invention more readily understandable, the present specification is accompanied by a set of drawings, which, by way of illustration and not limitation, represent the following.

PREFERRED EMBODIMENT OF THE INVENTION

Figure 1:
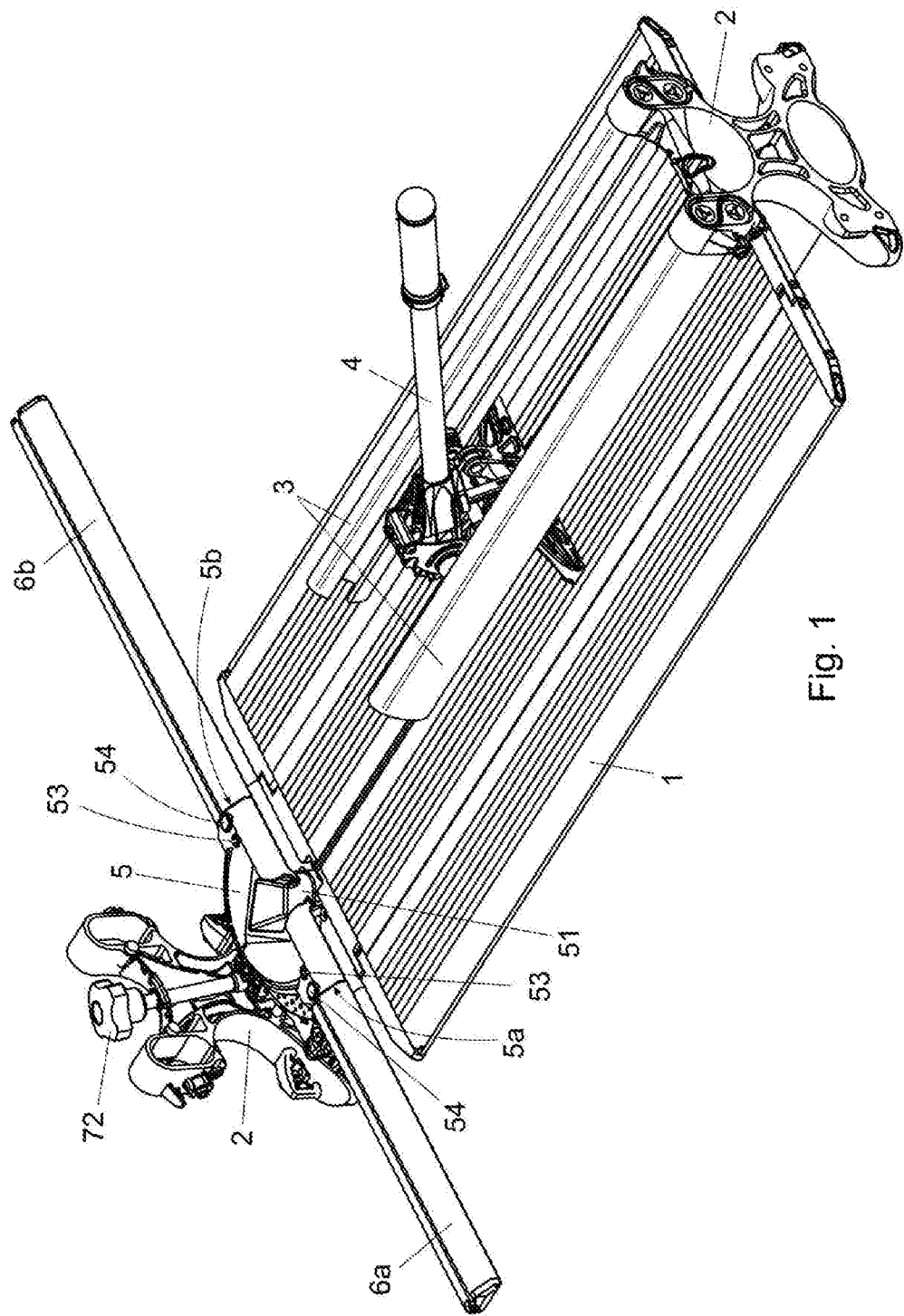
FIG. 1 shows a partial view of the machine. It schematically shows a manual ceramic cutter, in which a cross section of a segment of the displacement guides of the tool-holder head is shown to facilitate observation of the removable ruler of the invention, mounted on the base of the cutter.

In the exemplary embodiment shown in FIG. 1, a manual ceramic cutter is partially shown, which has a series of elements common to this type of machine, such as a base (1) that forms a support surface for the ceramic parts to be cut; end supports (2) on which guides (3) are mounted for the movement of the tool-holder head (4) suitable for the scoring and separation of the ceramic part to be cut.

Figure 3:
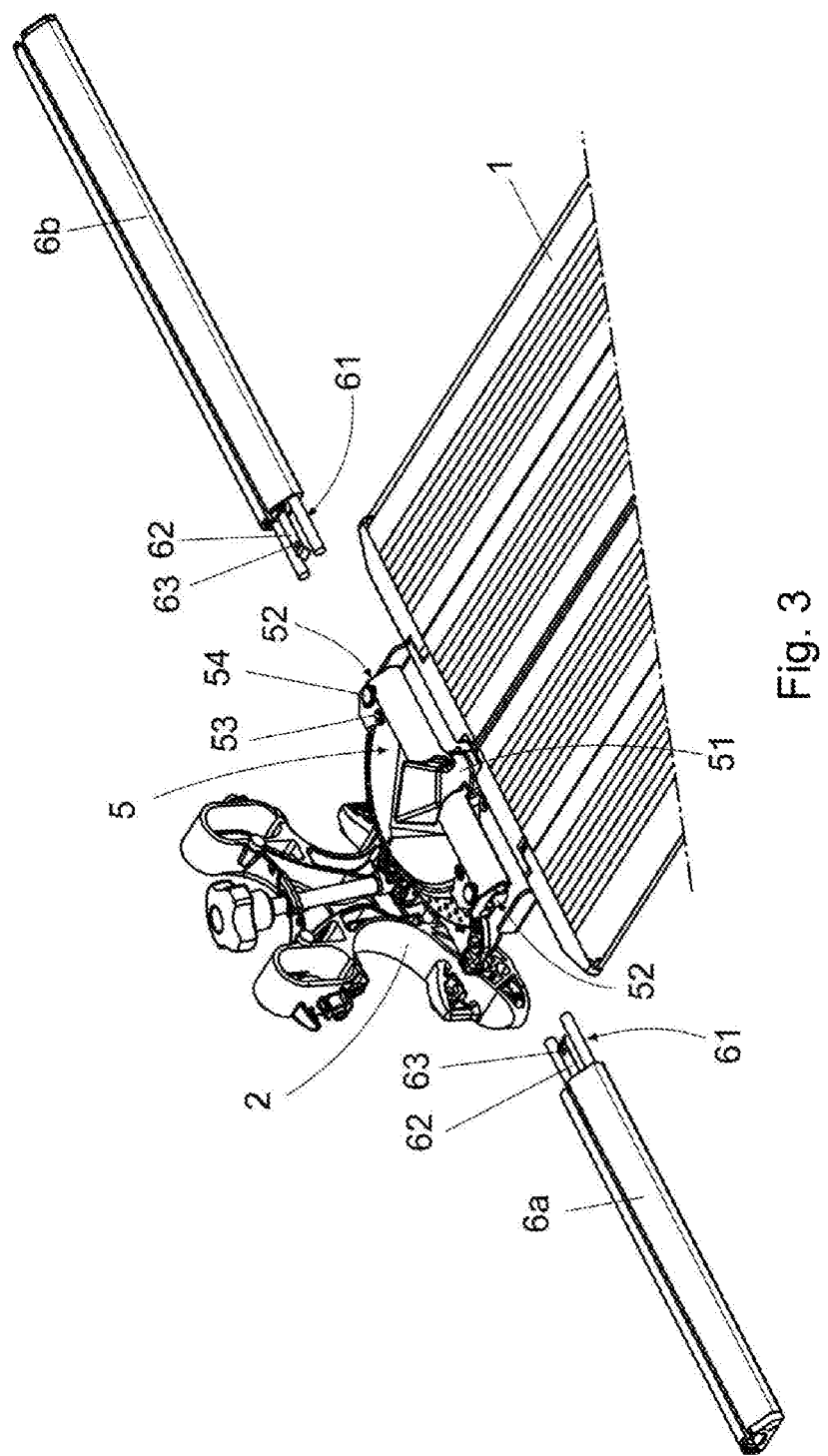
FIG. 3 shows a partial view of the cutter of the previous figure in which the ruler with the lateral extensions removed is shown.
Figure 4:
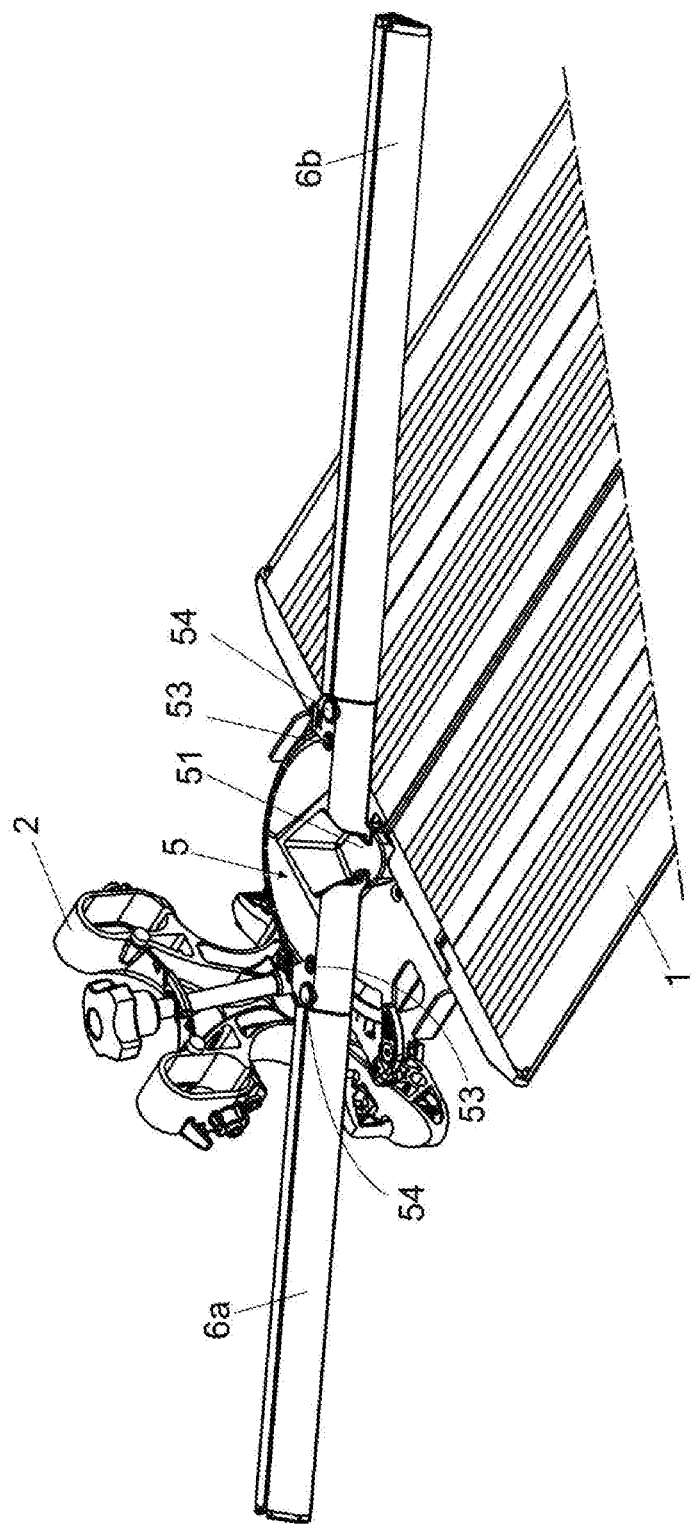
FIG. 4 shows a partial perspective view of the cutter with the ruler mounted and secured to a base forming an oblique angle with the longitudinal mid-plane of the base of the cutter.
Figure 5:
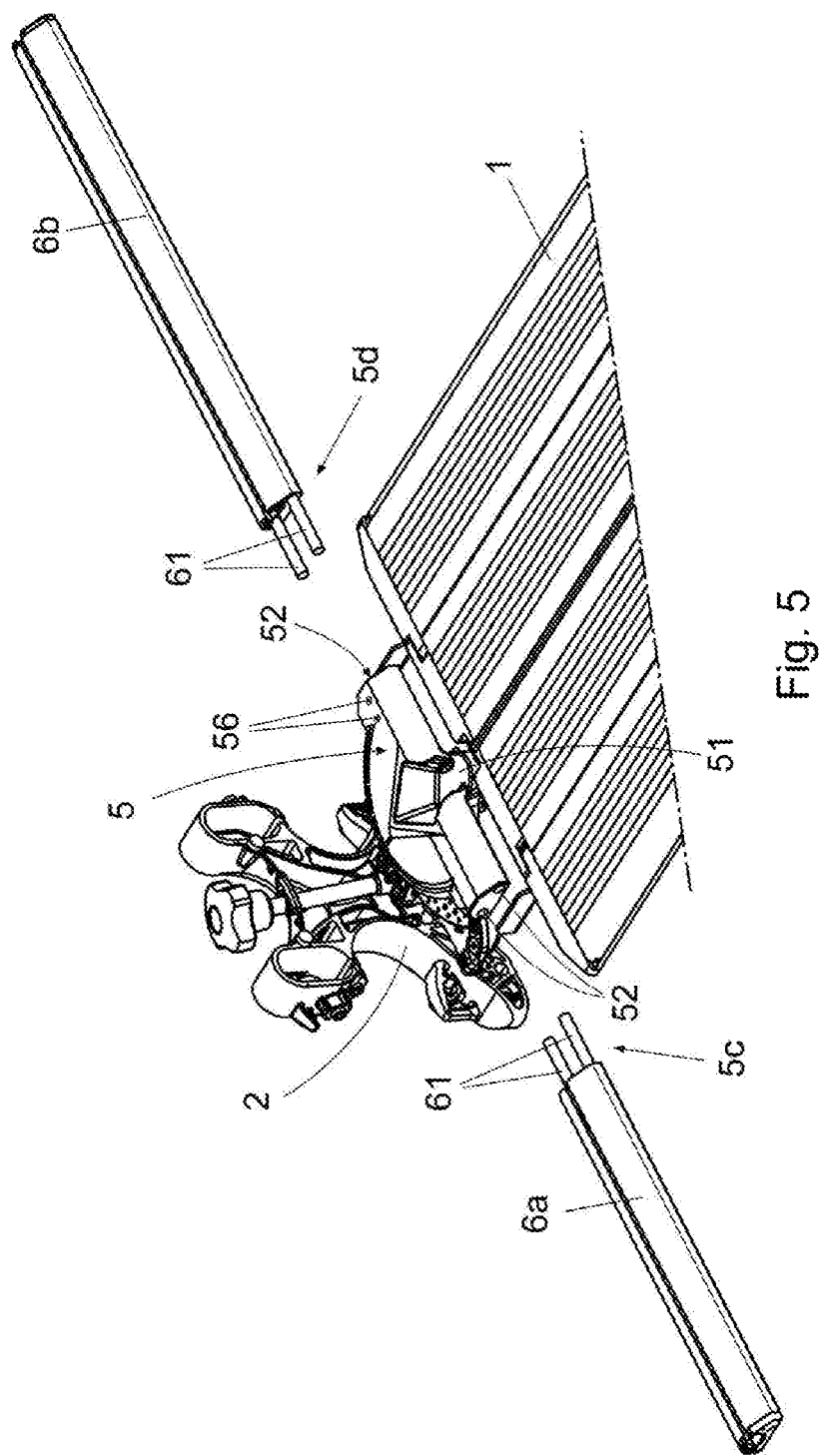
FIG. 5 shows a view similar to FIG. 3, with a variant embodiment of the securing means of the lateral extensions.

According to the invention, this cutter has a ruler formed by a rotary platform (5) permanently secured to the base and two removable lateral extensions (6a, 6b) of said platform (5), as can be observed in FIG. 3.

The platform (5) is secured to the base (1) along the lower area thereof by means of a rotary shaft (51), said platform (5) having securing means (5a, 5b) on the opposite ends for the rapid coupling and subsequent uncoupling of the lateral extensions (6a, 6b).

In one embodiment, shown in FIGS. 1 to 4, the securing means (5a, 5b) comprise: housings (52) to receive in a tight-fitting way ends (61) of the respective extensions (6a, 6b) that have a band (62) with a hole (63); pins (53) that can be coupled to the retention holes (63) of the extension in the mounting position with respect to the platform (5); and release buttons (54) of the bands (62) and of the respective extensions (6a, 6b).

In this way, when storing the cutter, one only needs to push the buttons (54) so that the extensions (6a, 6b) are uncoupled from the securing means (5a, 5b) and can be separated from the platform (5), which remains joined to the base (1).

Figure 2:
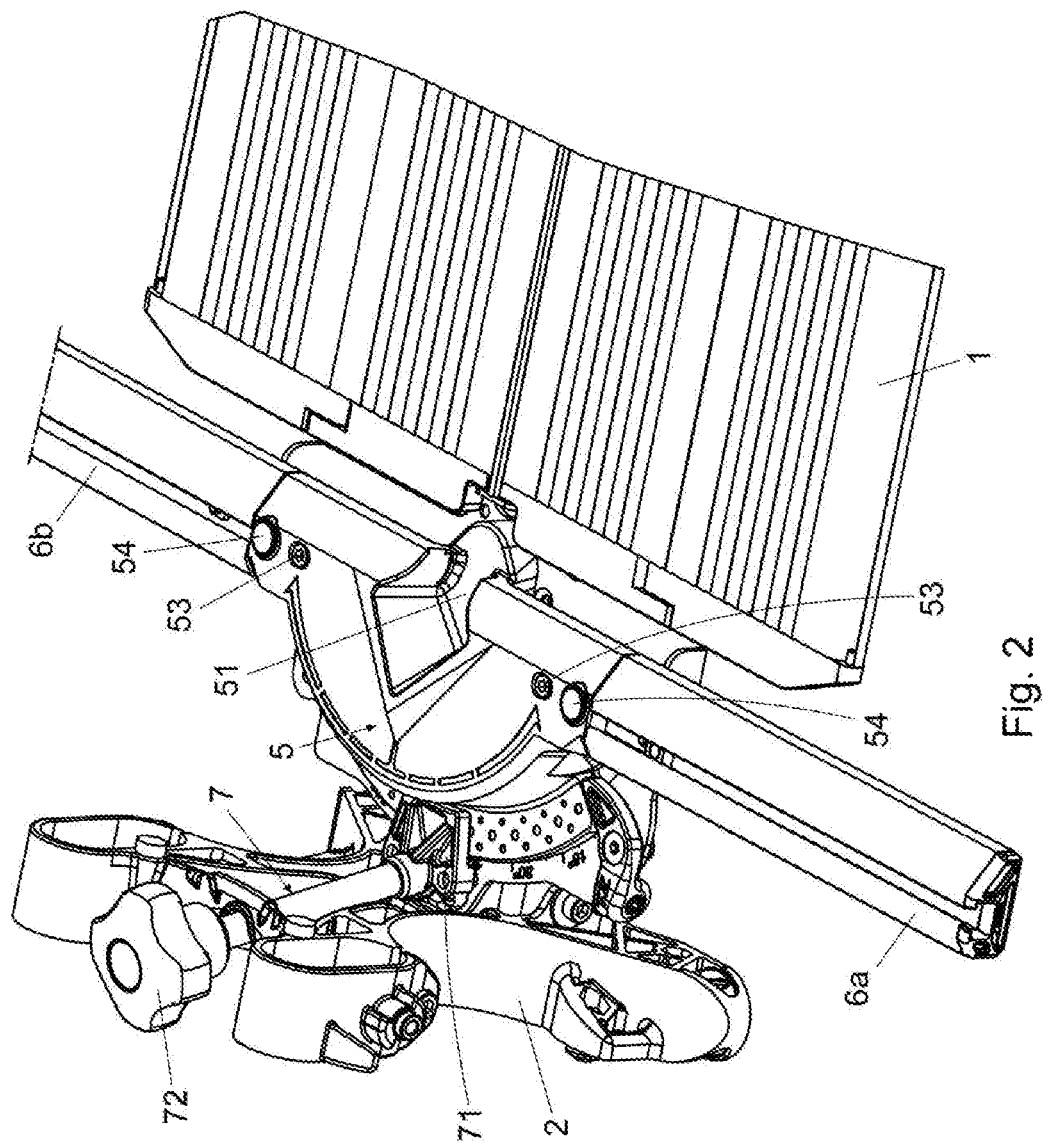
FIG. 2 shows a detailed perspective view of a segment of the cutter of the previous figure with the ruler mounted on the base of the cutter and disposed in a perpendicular way.

As can be observed in greater detail in FIG. 2, the ruler (5) has a securing element (7), in this case formed by a pressing device (71) that can be operated by means of a threaded knob (72) mounted on one of the end supports (2) of the guides.

Figure 6:
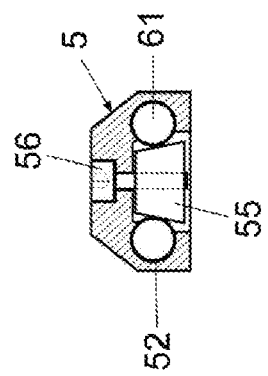
FIG. 6 shows a detailed cross section of the securing means of the lateral extensions of the previous figure, in a coupling position.

In the variant embodiment shown in FIG. 6, a variant embodiment of the securing means to secure the lateral extensions to the platform (5) is observed. In this case, the securing means (5c, 5d) comprise: housings (52) for receiving ends (61) of the respective extensions (6a, 6b) in a tight-fitting way; wedges (55) that tighten the sides of the ends (61) of the extensions against the inner surface of the housings (52) and screws (56) for actuating the wedges (55).

These securing means (5c, 5d) provide stable and resistant securing without clearance of the lateral extensions (6a, 6b) due to the action of the wedges (55).

Having sufficiently described the nature of the invention, in addition to an example of a preferred embodiment, it is hereby stated for the relevant purposes that the materials, shape, size and layout of the described elements may be modified, provided that it does not imply altering the essential characteristics of the invention claimed below.

The invention claimed is:

1. A removable ruler for manual ceramic cutters, suitable to be rotatably mounted on a base of a manual ceramic cutter, comprising;

two coaligned segments extending laterally from a rotary platform permanently secured to the base of the cutter by a rotary shaft; securing means for a rapid coupling and uncoupling of the two segments that provide lateral extensions wherein the securing means are releasable and comprise housings in the rotary platform to receive in a tight-fitting way at least two rods at the free ends of the respective segments, wherein each of the housings include a release member for actuation on the at least two rods at the free ends to uncouple the segment from the securing means;

wherein each of the housings include a wedge for tightening the sides of the at least two rods at the end of each segment against the inner surface of the housings; and wherein said release member comprises a screw threaded into the wedge for actuating the wedges within the housing.

* * * * *